235-379 SR

4/26/83 OR 4,381,445

United States Patent [19]

Jenkins et al.

[11] 4,381,445

[45] Apr. 26, 1983

[54] CASH DISPENSER WITH REJECT DUMP MEANS

[75] Inventors: Stuart M. Jenkins, Bognor Regis; John Wood, Southsea; David Martin, Milton, all of England

[73] Assignee: De La Rue Systems Limited, London, England

[21] Appl. No.: 235,365

[22] Filed: Feb. 19, 1981

[30] Foreign Application Priority Data

Feb. 19, 1980 [GB] United Kingdom ................. 8005481

[51] Int. Cl.³ ........................ G07F 7/10; G06K 17/00

[52] U.S. Cl. ....................................... 235/379; 221/13

[58] Field of Search .......................... 235/379; 221/13; 194/4 R

[56] References Cited

U.S. PATENT DOCUMENTS 4,020,972 5/1977 Lundblad ............................ 221/13

4,319,132 3/1982 Guibord ............................ 235/379

*Primary Examiner*—Harold I. Pitts

*Attorney, Agent, or Firm*—Sughrue, Mion, Zinn, Macpeak and Seas

[57] ABSTRACT

In automatic banknote dispensing apparatus, a banknote access module comprises an enclosure which can be fixed in the outer wall of a bank and within which is a platform mounted to pivot about a fixed axis between a first position, in which it receives banknotes from an inlet aperture in the enclosure and is accessible to a customer when a door of the enclosure is unlocked following a correct delivery of notes to the platform, and a second position in which it ejects notes from the enclosure through a reject outlet aperture, for example following an incorrect delivery of notes. A shroud formed integrally with the door blocks the banknote delivery inlet aperture when the door is open.

10 Claims, 9 Drawing Figures

CASH DISPENSER WITH REJECT DUMP MEANS

This invention relates to automatic banknote dispensing apparatus of the type adapted to deliver a predetermined sum of money.

The invention has special, but not exclusive reference, to a dispenser of the customer-operated type and which for example may be arranged to dispense sums of money through an external wall of a bank to a customer access station.

Problems arise when handling used currency notes because of their indeterminate condition and consequently it is usual in such dispensers to provide safety means to prevent incorrectly fed banknotes from reaching a user. Such safety means normally include a "double detector" device of known type which may be arranged to divert superposed, or partially adhered together, banknotes from the delivery flowpath and/or to control an escrow device (viz. an internal storage means which is adapted to store temporarily banknotes until the initial feeding operation has been completed). In such a system a stored stack containing incorrectly fed banknotes is diverted to a reject container, and thereafter, a repeat feeding cycle is initiated.

An example of such apparatus is to be found in British Pat. No. 1 459 854, in which banknotes fed from a delivery belt are stacked temporarily on a platform connected to an elevator belt the platform then being moved downwards on the belt to a position in which the banknotes may be removed by a user through an access door after which the platform is again carried on the belt up to the receiving position. In the event of an incorrect delivery, the stack of banknotes is rejected into a bin by tilting the platform, and the cycle is repeated. However, this apparatus is necessarily bulky because the first position of the platform is above the banknote access door.

The primary object of the invention is to provide a banknote access station having reject facilities and which is of a simple and compact construction such that when it is fixed to a banknote delivery means only the enclosure of the access station need project through the wall.

The invention consists in a banknote access station for an automatic banknote dispenser having means for generating signals indicative of a correct delivery of banknotes and an incorrect delivery of banknotes, the banknote access station comprising:

an enclosure having an inlet aperture to permit the entry of banknotes from a banknote delivery device in the dispenser, a door providing access to the enclosure and a reject outlet aperture;

a platform mounted within the enclosure, for reciprocating pivotal movement about a fixed axis between a first position and a second position, at a location such that in its first position the platform receives and supports banknotes fed from the inlet and is accessible to a user when the door is open for removal of the banknotes from the platform, and in its second position banknotes are ejected from the platform through the reject outlet aperture;

locking means to secure the door in a closed position; and, control means for releasing the locking means to allow opening of the door in response to a signal indicative of the completion of a correct delivery of banknotes to the platform and relocking the door after removal of the banknotes by the user, the control means being responsive to a signal indicating an incorrect delivery of banknotes to the platform to cause the platform to pivot from the first position to the second position to eject the banknotes and thereafter to return to the first position.

Such a banknote access station can be built in very compact form and when access to the dispenser is through a wall, the hole formed in the wall need only be large enough to accommodate the said enclosure. For security purposes in such a compact device a cover is preferably arranged to block the inlet aperture when the door is open.

The cover may take the form of a shroud formed integrally with the door to move over and block the inlet aperture as the door is moved to its open position. Advantageously, the door is pivotally mounted on a horizontal axis and occupies substantially the full width of the enclosure.

In the preferred embodiment, the door is biased to its closed position by gravity. Also in this embodiment, after a correct delivery of banknotes to the platform, re-locking of the door is delayed for a predetermined period to facilitate the removal of the banknotes by the user.

Preferably, the platform is adapted to pivot between the first and second positions such that it is caused to move from its first position by gravity in one direction to its second position, and is returned by rotating means under power in the opposite direction to its first position.

The user may accidentally leave some or all of the banknotes on the platform, and in the preferred embodiment there is an infra-red photoelectric device sited below an aperture formed in the platform which provides a signal to the control means when banknotes or other articles are present on the platform. The control means then dumps the contents of the platform, for example at the end of the predetermined period for removal of the banknotes.

The control means may be of any convenient form but preferably it comprises a programmed microprocessor adapted to receive signals from a counter/doubles detector associated with the dispenser and thereafter to sequence control the operation of the door locking and platform-actuating driving motors in accordance with signals derived from the above-mentioned presence and position detector means.

In order that the invention may be better understood, one example of a banknote dispenser incorporating the invention will now be described with reference to the accompanying drawings; in which.

Figure 8:
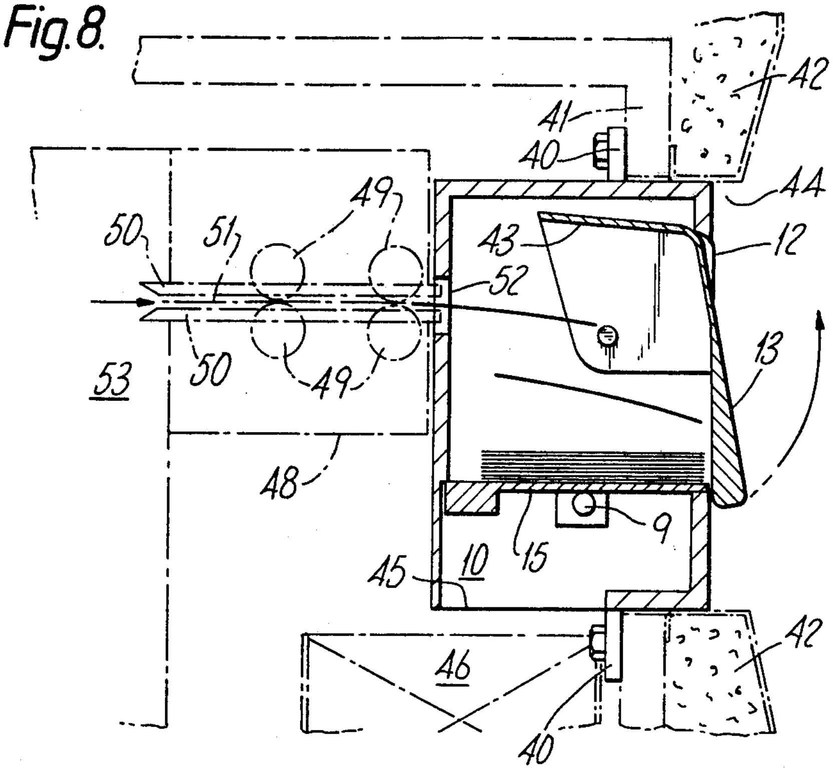
FIGS. 8 and 9 illustrate diagrammatically the way in which the access module may be incorporated in a cash dispenser in an outer wall of a bank and shows an outlet flap in closed and open positions respectively.
Figure 9:
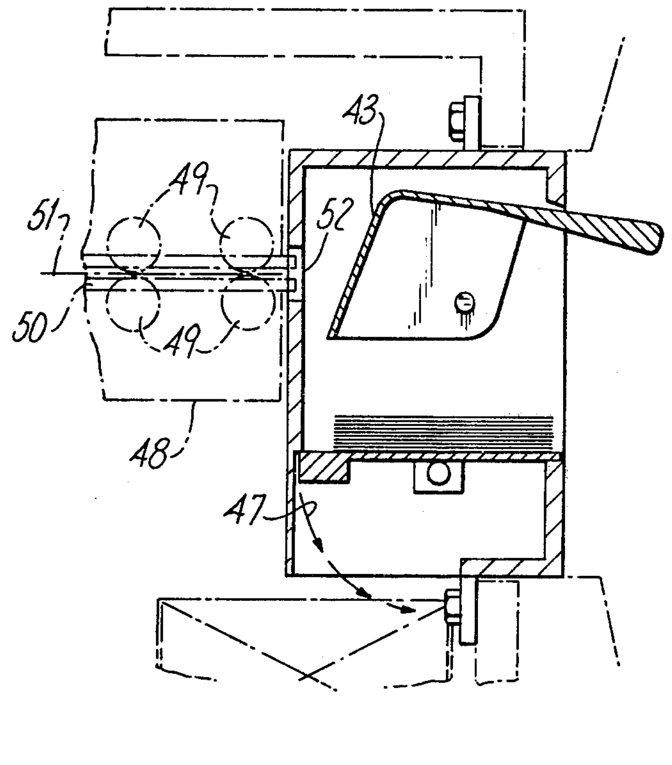

To enable a better understanding of the use of a banknote access station embodying the invention reference will first be made to FIGS. 8 and 9. In FIG. 8 a customer access module 10 is shown bolted by means of attachment lugs 40 to a wall 41 of a safe which is located against an outer wall or facia of a bank so that the front wall of the module 10 is located in an aperture 44 in the outer wall 42 of the bank. The front aperture 12 of module 10 is normally closed by an access door in the form of a pivoted outlet flap 13. Within the module 10 is a support platform 15 pivoted on a fixed axis 9, for reciprocating movement between a first position, shown in FIG. 8, and a second position. The platform is so located in the device 10 that in its first position it receives banknotes from an inlet aperture 52 and supports them to form a stack. Below the platform 15 is a reject outlet aperture 45 through which rejected banknotes may fall into a reject box 46 when platform 15 is tilted, as indicated by arrows 47 on FIG. 9, to the second (vertical) position.

The banknote dispenser 53 is otherwise of conventional construction and includes a banknote conveyor 48 with conventional rollers 49 and guides 50 which convey notes along flowline 51, through inlet aperture 52 into the access module 10. Because of the compact construction of the device 10, the inlet aperture 52 is opposite and quite close to the front aperture 12 and a shroud 43 integral with the outlet flap 13, is arranged to obscure aperture 52 when flap 13 is open and thereby to prevent access to the feeder mechanism (see FIG. 9).

Figure 1:
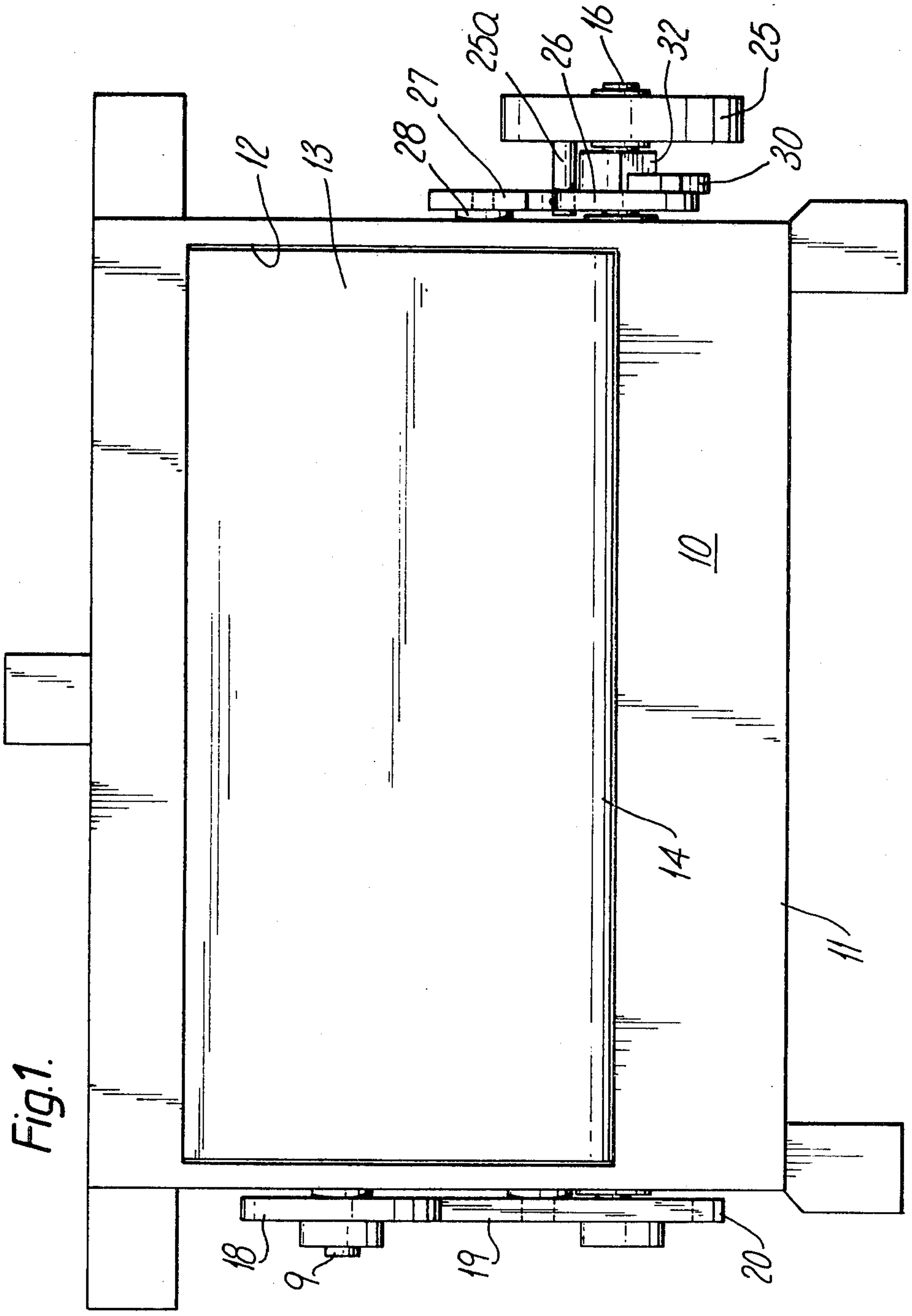
FIG. 1 is a front elevation of a part of a cash dispenser, in the form of a customer access module of a cash dispenser, incorporating the present invention.

In FIG. 1 is shown a more detailed front elevation of access module 10 which comprises a strong steel box-like structure 11.

Figure 2:
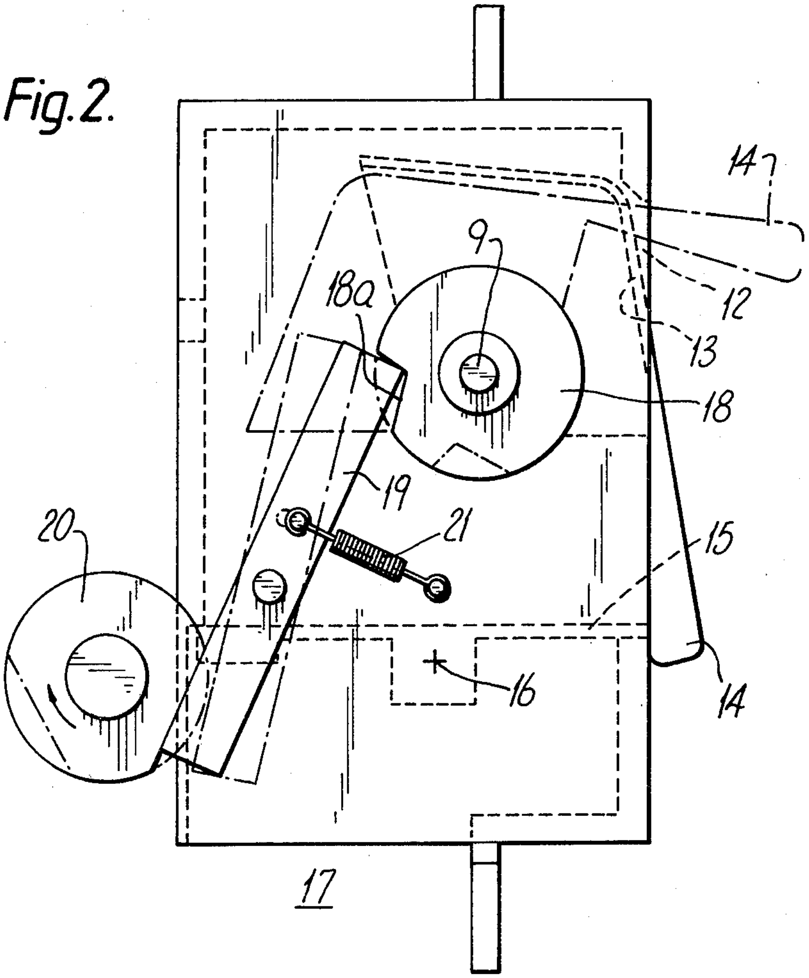
FIG. 2 is a side elevation of the left hand side of the module shown in FIG. 1.

The outlet flap 13 is partially counterbalanced but its lower portion 14 is thickened and is of considerable weight so as to ensure that when it is released from the position shown in chain-dotted line in FIG. 2, it will always fall under the influence of gravity to the position shown in full line.

The outlet flap 13 can be locked in the closed position by flap locking means comprising a rotary detent member 18 (FIG. 2) which has a notch or detent 18*a* arranged to cooperate with a pivoted flap-locking lever 19, which is urged by a spring 21 into the detent 18*a* but can be pivoted counter-clockwise by the rotation of a cam 20, driven by a motor.

When the correct amount in banknotes has been dispensed into the module a signal tells the cam motor to drive the cam 20 which rotates and releases the lever 19 from the detent member 18 thus enabling the customer to lift the access flap 13 and remove the banknotes.

When the banknotes have been removed and the flap 13 has returned to its closed position the motor which drives the cam 20 receives a signal to continue until the cam 20 allows the lever 19 to re-engage with the notch or detent 18*a* in the detent member 18 under the influence of spring 21 and thereby to lock the door in the closed position.

The closure of the flap 13 prevents damage to the platform 15 and the dispenser access module generally due to corrosion, vandalism, etc. The flap 13 is released only to allow a customer who has completed a transaction to remove banknotes from the platform.

Figure 6:
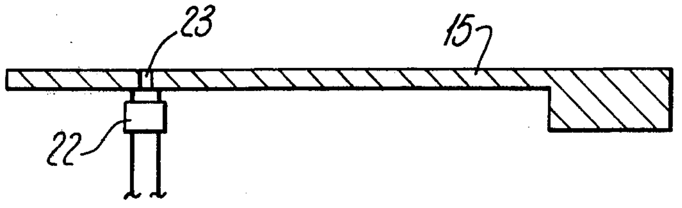
FIG. 6 is a section through a tiltable platform, forming part of the module shown in FIGS. 1 to 3.

If a banknote remains on the platform 15 after release of the door it will be detected by an infra-red presence detector 22 which "sees" the banknote through an aperture 23 (FIG. 6). This will cause a signal to be sent to the motor operating cam 20 to inhibit operation of the motor and prevent locking of the flap 13.

Figure 5:
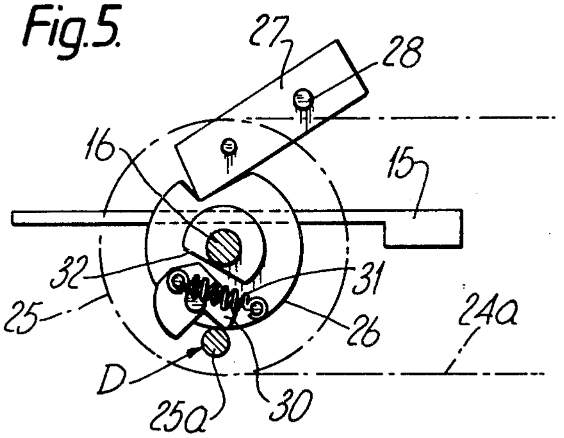
FIGS. 4 and 5 illustrate different positions of a cam and cam follower which is shown in FIG. 3.
Figure 3:
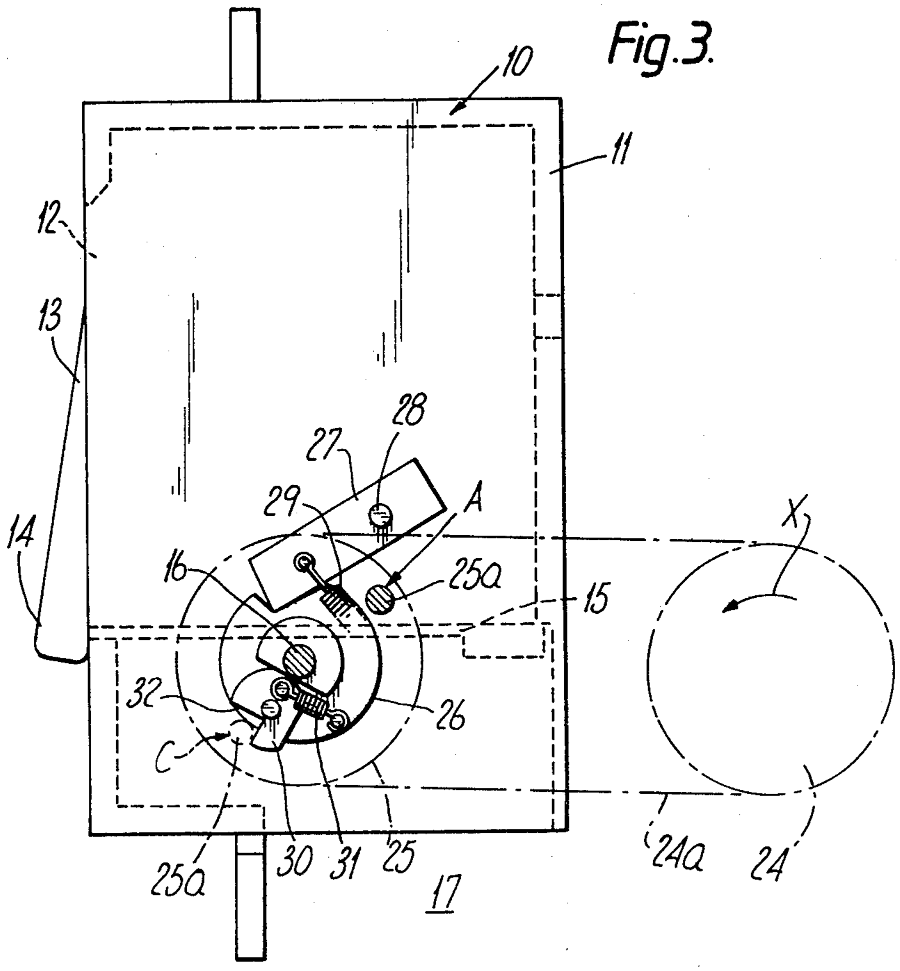
FIG. 3 is a side elevation of the right hand side of the module shown in FIG. 1.
Figure 4:
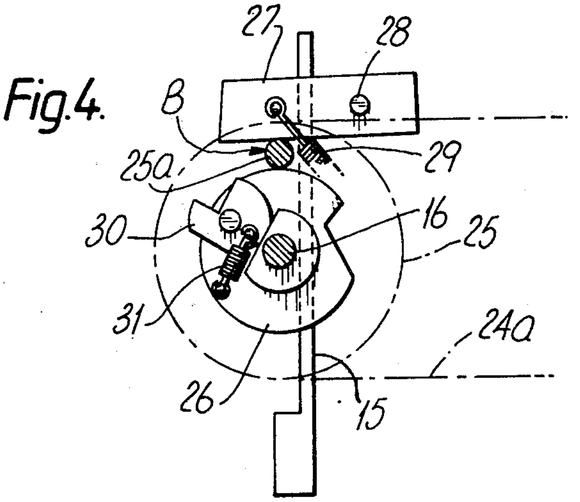

The platform 15 is fixed on a shaft 16 so as to be tiltable between the horizontal position shown in FIGS. 3 and 5 and the vertical position shown in FIG. 4, in which position incorrectly dispensed banknotes or objects placed on the platform by customers are ejected from the module through the reject outlet. When the infra-red sensor 22 detects such banknotes or objects through aperture 23 in the platform 15, a signal is sent to a dump motor 24 (FIG. 3) which, via a belt 24*a*, drives a pulley 25 in the direction indicated by arrow X. Pulley 25, which runs freely on shaft 16, has fixed to it a driving pin 25*a*. A notched wheel dump catch 26 is also pinned to the shaft 16. The pulley 25 and notched wheel 26 normally rest in the position shown in FIG. 3 with driving pin 25*a* in the position marked A.

When a "dump" signal is received, the motor 24 drives the pulley and pin 25*a* anti-clockwise (as seen in FIG. 3) and firstly releases a dump latching lever 27 which is pivoted at 28 and biased anti-clockwise by a spring 29. Release of latching lever 27 enables the dump platform 15 to pivot clockwise, due to gravity, into the vertical position shown in FIG. 4. Pin 25*a* is now in position B.

The motor 24 continues to rotate the pulley 25 until pin 25*a* engages a spring loaded drive tooth 30 pivotally mounted on the notched wheel 26 but held in position against a cam surface 32 by a spring 31. Thereafter the notched wheel 26 rotates with the pulley 25 lifting the platform 15 as it goes until position C (shown in chain dotted line in FIG. 3), is reached. The latching lever 27 then re-engages dump catch 26 to lock the platform 15 in its horizontal position and the drive pin 25*a* then starts to overcome the spring 31 and to rotate the tooth 30 until drive pin 25*a* reaches position D (See FIG. 5). Once it has passed this point the drive tooth 30 snaps back into its normal position where it is restrained by engagement with the cam 32. The drive pulley continues on until drive pin 25*a* reaches its rest position A.

Thus, once during every revolution of the dump motor 24 and pulley 25 the platform 15 falls from a horizontal position (FIG. 3) to a vertical position (FIG. 4) thereby dumping any banknotes on the platform 15 through aperture 45 (FIGS. 8 and 9) into box 46, and is then driven back to a horizontal position (FIG. 5).

Figure 7:
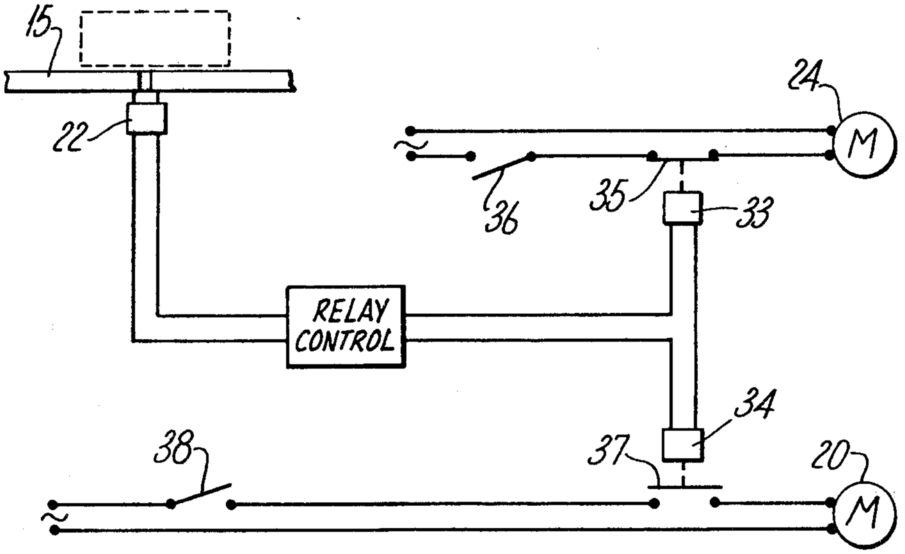
FIG. 7 is a simplified form of circuit diagram.

FIG. 7 is a very much simplified electrical circuit diagram of the system. It shows the door-operating motor 20' for the cam 20 and the motor 24 operating the tiltable platform together with a portion of platform 15 and infra-red reflecting detector 22.

If anything is present on the platform 15 the detector 22 produces a signal which operates two relays 33 and 34. Relay 33 closes switch 35 in the circuit of the dump motor 24 so that when a dump switch 36 is closed the dump motor will operate. Relay 34 opens a switch 37 in the circuit of the access flap motor 20' so that when flap operating switch 38 is closed the flap motor will not operate. Relocking of the access flap may be delayed by introducing a delay device in the electrical circuit.

Thus, it is possible to operate the dump sequence if there is anything present on the platform 15 but it is not possible to lock the access flap.

Detectors (e.g. of a conventional infra-red type) may be provided to detect the positions of the detent member, the flap locking lever and the latching lever.

Signals derived from these detectors and from a conventional counter/doubles detector associated with the dispenser may be used to control the sequence of operations of the flap-locking and platform-actuating driving members under control of a programmed microprocessor (not shown).

A banknote access station according to this invention is therefore able to provide access to a correct delivery of banknotes reliably, and has a very compact design which is particularly advantageous when access is to be made through a wall in the bank.

We claim:

1. A banknote access station for an automatic banknote dispenser having a banknote delivering device, the banknote access station comprising:

an enclosure formed with an inlet aperture and a reject outlet aperture;

means within the enclosure for receiving banknotes from the delivery device through the inlet aperture, the banknote receiving means being formed by a platform pivotable between a first position, in which the platform receives and supports banknotes fed from the inlet aperture and also is accessible to the user when the door is open, and a second position in which banknotes are ejected from the platform through the reject outlet aperture, in the case of an incorrect delivery;

a door to the enclosure giving a user access to the platform; locking means to secure the door in a closed position;

control means for controlling the movement of the platform and the operation of the locking means, the control means operating after each dispensing operation either to release the locking means to allow the user to open the door and remove the banknotes or to cause the platform to pivot so as to eject any banknotes thereon along a reject path and thereafter to return the platform to its first position; and an inlet aperture cover formed integrally with the door and moving with the door to block the inlet aperture when the door is moved to its open position and to unblock the inlet aperture when the door is returned to its closed position.

2. A banknote access station in accordance with claim 1, wherein the platform is adapted to move by gravity in one direction from its first position to its second position, when released by the control means, the control means including rotating means for driving the platform in the opposite direction back to its first position.

3. A banknote access station in accordance with claim 1, comprising, for locking the platform in its first position, a notched member fixed to the platform and a spring biased latching lever for engaging the notched member.

4. A banknote access station according to claim 1, comprising, for locking the platform in its first position, a notched member fixed to the platform and a spring biased latching lever for engaging the notched member, and wherein the rotating means for driving the platform back to its first position also serves to free the latching lever from the notched member.

5. A banknote access station according to claim 1, further comprising a banknote presence detector which provides a signal to the control means when banknotes or other articles are present on the platform.

6. A banknote access station in accordance with claim 1, wherein the door is pivotally mounted on a horizontal axis and occupies substantially the full width of the enclosure.

7. A banknote access station in accordance with claim 1, wherein the door is biased to its closed position by gravity.

8. A banknote access station in accordance with claim 1, further comprising a detent member fixedly mounted to pivot with the door and a spring biased pivoted door locking lever for engaging with the detent member to lock the door in its closed position.

9. A banknote access station in accordance with claim 8, including a motor-driven cam adapted to withdraw the door locking lever from the detent of the detent member, to unlock the door.

10. In an automatic banknote dispenser for dispensing to a user a predetermined sum of money and having counting and incorrect feed detection means; the improvement comprising: banknote delivery means; a cash access station, adjacent the banknote delivering means, including an enclosure having an inlet aperture positioned to permit the entry of banknotes from the banknote delivering means, a door providing access to the enclosure, an inlet aperture cover formed integrally with the door and moving with the door to block the inlet aperture when the door is moved to its open position and to unblock the inlet aperture when the door is returned to its closed position, and a reject outlet aperture; a platform mounted within the enclosure for reciprocating pivotal movement about a fixed axis between a first position, and a second position, at a location such that in its first position the platform receives and supports banknotes fed from the inlet and is accessible to a user when a door is open for removal of the banknotes from the platform, and in its second position banknotes are ejected from the platform through the reject outlet aperture;

locking means to secure the door in a closed position; and control means for releasing the locking means to allow opening of the door in response to a signal indicative of the completion of a correct delivery of banknotes to the platform and relocking the door after removal of the banknotes by the user, the control means being responsive to a signal indicating an incorrect delivery of banknotes to the platform to cause the platform to pivot from the first position to the second position to eject the banknotes and thereafter to return to the first position, and means mounted adjacent the reject outlet aperture for receiving banknotes ejected from the cash access station when the platform is pivoted to its second position.

* * * * *